3,067,251
Patented Dec. 4, 1962

3,067,251
TRIS(2 - CARBAMOYLETHYL)PHOSPHINE OXIDE, DERIVATIVES THEREOF, AND PROCESS FOR MAKING SAME
Michael M. Rauhut, Norwalk, and Andrew M. Semsel, Stamford, Conn., assignors to American Cyanamid Company, New York, N.Y., a corporation of Maine
No Drawing. Filed Apr. 7, 1961, Ser. No. 101,333
12 Claims. (Cl. 260—561)

The present invention relates to novel organophosphorus compounds and to the preparation of same. More particularly, the instant discovery concerns new and useful tertiary phosphine oxides prepared by a novel and straightforward method.

According to the present invention and $\alpha,\beta$-unsaturated amide of the formula

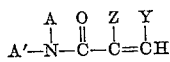

is reacted with elemental phosphorus and a base, in the presence of water, as will be seen hereinafter, to produce the corresponding tertiary phosphine oxide having the formula

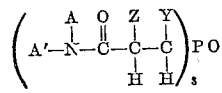

wherein A in the above formulae represents H, lower alkyl and phenyl, A' stands for H or lower alkyl, Z stands for H or $CH_3$, and Y stands for H, $CH_3$ or phenyl.

Pursuant to a typical embodiment of the present invention the following reaction is made to take place

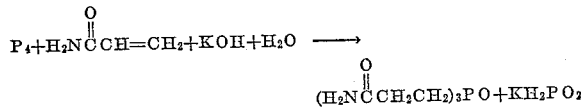

While the elemental phosphorus reactant employed in the equation just given is in a finely-divided solid state, the present invention contemplates the use of molten phosphorus, and therefore temperatures above the melting point of phosphorus, i.e., temperatures above 46° C. In fact, a wide range of temperatures is contemplated herein on the order of about 0° C. to about 175° C., preferably from 15° C. to 75° C.

By the same token, the reactions of the present invention may be carried out at atmospheric, sub-atmospheric and super-atmospheric pressures. At high temperatures, say, from 100°–175° C., super-atmospheric pressures are generally employed, as is evident to the person skilled in the art. Batch, continuous or semi-continuous processes may be employed.

According to a preferred embodiment, an aqueous strong base is employed. Typical strong bases within the purview of the instant discovery are the alkali metal hydroxides, the alkaline earth metal hydroxides, and the like, such as Na, Li, K hydroxide, Ca, Ba hydroxide, etc. If desired, reaction is made to take place in the presence of a solvent. Typical solvents are acetonitrile, alkanols, such as methanol, ethanol, propanol, butanol, t-butyl alcohol, ethers, such as dioxane, diethoxyethane, diethylether of diethylene glycol, tetrahydrofuran, and the like, dimethylformamide, dimethylsulfoxide, pyridine, and numerous other like solvents which under the conditions of the reaction do not interfere with the production of the desired products.

Typical $\alpha,\beta$-unsaturated amide reactants of the formula

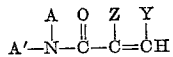

above, are acrylamide, 1-methylacrylamide, N-methylacrylamide, N,N-dimethylacrylamide, N-phenylacrylamide, crotonamide, cinnamide, and the like.

Generally, the reactants contemplated herein are brought together in stoichiometric amounts, as demonstrated by the illustrative specific embodiment above. However, an excess of any of these reactants with respect to the other reactant may be employed and the amount of excess is governed only by practicality.

The products of the present invention are useful as fire retardants for cotton cloth. For example, cotton cloth dipped, according to well-known procedures, in a suitable solution of any one of these tertiary phosphine oxides manifests desirable fire retardance.

The present invention will best be understood by virtue of the following examples which are merely illustrative and not intended to limit the scope of the invention, except insofar as the invention is described in the claims.

EXAMPLE I

Tris(2-Carbamoylethyl)phosphine Oxide

A solution of 20 milliliters (0.2 equivalent) of 10 N aqueous potassium hydroxide in 80 milliliters of 2 B ethanol is added dropwise during 30 minutes to a well stirred mixture of 12.4 grams (0.4 gram atom) of finely divided white phosphorus, 63.9 grams (0.9 mole) of acrylamide, and 200 milliliters of 2 B ethanol under nitrogen. The temperature is maintained at 30° C.– 35° C. by gentle cooling. The mixture from which the product has begun to separate is stirred an additional 45 minutes at 35° C., cooled to 5° C., and filtered to obtain 50.1 grams of white solid, melting point 195° C.– 200° C. The solid is dissolved in 125 milliliters of hot glacial acetic acid, and the solution is cooled to room temperature. While unreacted phosphorus is not generally found, if present it can be separated conveniently at this point by decantation under nitrogen. The solution is filtered through diatomaceous earth, diluted with 600 milliliters of 2 B ethanol, and stored at 5° C. for 30 minutes. The white solid is collected and washed with 2 B ethanol to obtain 40.0 grams (44 percent) of tris(2-carbamoylethyl)phosphine oxide, melting point 206° C.–209° C. Recrystallization from dimethylformamide gives an analytical sample, melting point 208°– 210° C.

Analysis.—Calculated for $C_9H_{18}N_3O_4P$: N, 15.96; P, 11.76. Found: N, 16.37; P, 11.68.

EXAMPLE II

The process of Example I is repeated in every essential respect with the exception that only 0.6 mole of acrylamide is employed. While nearly all the phosphorus reacts, the yield of tris(2-carbamoylethyl)phosphine oxide is 20 percent by weight, based upon theory.

EXAMPLE III

Example I is repeated in every essential respect with the exception that only 0.6 mole of acrylamide is used and the reaction temperature is maintained at 45° C.–50° C. Under these conditions, the yield of tris(2-carbamoylethyl)phosphine oxide is 16 percent by weight, based upon theory.

EXAMPLES IV–X

The following examples are carried out essentially as in Example I, above, the differences existing between Example I and each of Examples IV through X are set out in the following table:

TABLE I

| Example | Reactant | Solvent | Base | Temperature, °C. | Product |
|---|---|---|---|---|---|
| IV | 2-methylacrylamide | $C_2H_5OH$ | NaOH | 60–70 | $(H_2NC(O)-CH(CH_3)-CH_2)_3PO$ |
| V | N,N-dimethylacrylamide | $C_2H_5OH$ | KOH | 30–40 | $[(CH_3)_2NC(O)CH_2CH_2]_3PO$ |
| VI | cinnamamide | dimethylformamide | $Ba(OH)_2$ | 75–100 | $(H_2NC(O)CH_2CH(C_6H_5))_3PO$ |
| VII | N-methylacrylamide | do | KOH | 45–100 | $(CH_3NHC(O)CH_2CH_2)_3PO$ |
| VIII | N-phenylacrylamide | $C_2H_5OH$ | NaOH | 50–55 | $(H_5C_6NHC(O)CH_2CH_2)_3PO$ |
| IX | crotonamide | dimethylformamide | $Ca(OH)_2$ | 75–100 | $(H_2NC(O)CH_2CH(CH_3))_3PO$ |
| X | N-butylacrylamide | ethanol | KOH | 45–100 | $(C_4H_9NHC(O)CH_2CH_2)_3PO$ |

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

We claim:

1. A tertiary phosphine oxide of the formula

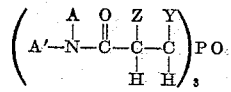

wherein A is a member selected from the group consisting of H, lower alkyl and phenyl, A' is a member selected from the group consisting of H and lower alkyl, Z is a member selected from the group consisting of H and $CH_3$, and Y is a member selected from the group consisting of H, $CH_3$ and phenyl.

2.
$$(H_2NCCH_2CH_2)_3PO$$

3.

4.
$$(CH_3NHCCH_2CH_2)_3PO$$

5.
$$[(CH_3)_2NCCH_2CH_2]_3PO$$

6.
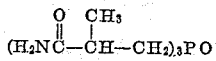

$$(H_5C_6NHCCH_2CH_2)_3PO$$

7. A method of preparing a tertiary phosphine oxide of the formula

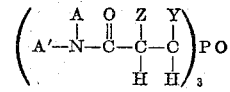

wherein A is a member selected from the group consisting of H, lower alkyl and phenyl, A' is a member selected from the group consisting of H and lower alkyl, Z is a member selected from the group consisting of H and $CH_3$, and Y is a member selected from the group consisting of H, $CH_3$ and phenyl, which comprises reacting an $\alpha,\beta$-unsaturated amide of the formula

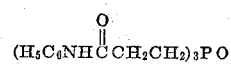

wherein A', A, Z and Y have the meanings given hereinabove, with elemental phosphorus and a base, in the presence of water, and recovering the corresponding tertiary phosphine oxide of the formula given above.

8. The method of claim 7 wherein the amide reactant is acrylamide.

9. The method of claim 7 wherein the amide reactant is 2-methylacrylamide.

10. The method of claim 7 wherein the amide reactant is N-methylacrylamide.

11. The method of claim 7 wherein the amide reactant is N,N-dimethylacrylamide.

12. The method of claim 7 wherein the amide reactant is N-phenylacrylamide.

References Cited in the file of this patent

UNITED STATES PATENTS 2,957,931    Hamilton et al.    Oct. 25, 1960